US009010393B2

(12) United States Patent
Araujo Da Silva et al.

(10) Patent No.: US 9,010,393 B2
(45) Date of Patent: Apr. 21, 2015

(54) RUBBER COMPOSITION FOR TIRE COMPRISING AN ORGANOSILICON COUPLING SYSTEM

(75) Inventors: Jose Carlos Araujo Da Silva, Pont-du-Chateau (FR); Nathalie Binde, Clermont-Ferrand (FR); Pierre Robert, Greer, SC (US); Sebastien Sterin, Saint Cyr Au Mont D'Or (FR); Anne Veyland, Marsat (FR)

(73) Assignee: Michelin Recherche et Technique, S.A., Granges-Paccot (CH)

( * ) Notice: Subject to any disclaimer, the term of this patent is extended or adjusted under 35 U.S.C. 154(b) by 1485 days.

(21) Appl. No.: 11/920,627

(22) PCT Filed: May 11, 2006

(86) PCT No.: PCT/EP2006/004437
§ 371 (c)(1),
(2), (4) Date: Mar. 19, 2009

(87) PCT Pub. No.: WO2006/125534
PCT Pub. Date: Nov. 30, 2006

(65) Prior Publication Data
US 2009/0234066 A1    Sep. 17, 2009

(30) Foreign Application Priority Data
May 26, 2005    (FR) .................................... 05 05516

(51) Int. Cl.
*C08K 5/23*    (2006.01)
*C08K 5/372*   (2006.01)
(Continued)

(52) U.S. Cl.
CPC ............. *C08K 5/5465* (2013.01); *C08K 5/5455* (2013.01); *C08L 21/00* (2013.01); *Y10S 152/905* (2013.01)

(58) Field of Classification Search
USPC ......... 524/575.5, 552, 492; 525/326.3, 332.5, 525/333.1, 341, 374, 342; 152/905, 209.5; 156/525
See application file for complete search history.

(56) References Cited

U.S. PATENT DOCUMENTS 4,118,367 A * 10/1978 Dawes et al. ................. 524/575
5,185,418 A    2/1993 Furukawa et al.
(Continued)

FOREIGN PATENT DOCUMENTS

EP    501 227    9/1992
EP    0 581 618 A    2/1994
(Continued)

OTHER PUBLICATIONS

Rubbercon 77, Int. Rubber Conf., vol. 1, Paper No. 18, Publisher: Plast. Rubber Inst., London, England, Coden:39BNAE, 1977, XP009060017.
(Continued)

*Primary Examiner* — Satya Sastri
(74) *Attorney, Agent, or Firm* — Dickinson Wright PLLC

(57) ABSTRACT

Tyre and rubber composition for tyre, based on at least one isoprene elastomer (for example natural rubber), an inorganic filler as reinforcing filler (for example silica) and a coupling system which provides the bonding between the said reinforcing inorganic filler and the isoprene elastomer, the said coupling system comprising, in combination:
as first coupling agent, a silane sulphide compound;
as second coupling agent, an at least bifunctional organosilicon compound (for example an organosilane or an organosiloxane) which can be grafted to the elastomer by means of an azodicarbonyl functional group (—CO—N=N—CO—).

36 Claims, 1 Drawing Sheet

(51) Int. Cl.
*C08K 5/54* (2006.01)
*C08K 5/5415* (2006.01)
*C08L 7/02* (2006.01)
*C08K 5/5465* (2006.01)
*C08K 5/5455* (2006.01)
*C08L 21/00* (2006.01)

(56) References Cited

U.S. PATENT DOCUMENTS

| | | | |
|---|---|---|---|
| 5,227,425 | A | 7/1993 | Rauline |
| 5,362,794 | A | 11/1994 | Inui et al. |
| 5,852,099 | A | 12/1998 | Vanel |
| 5,900,449 | A | 5/1999 | Custodero et al. |
| 5,929,149 | A | 7/1999 | Matsuo et al. |
| 6,053,226 | A * | 4/2000 | Agostini .................. 152/209.5 |
| 6,372,843 | B1 | 4/2002 | Barruel et al. |
| 6,774,255 | B1 * | 8/2004 | Tardivat et al. ............. 556/427 |
| 2003/0114601 | A1 | 6/2003 | Cruse et al. |
| 2003/0144393 | A1 | 7/2003 | Barruel et al. |
| 2004/0132880 | A1 | 7/2004 | Durel et al. |
| 2004/0220307 | A1 | 11/2004 | Wu |
| 2006/0217473 | A1 | 9/2006 | Hergenrother et al. |
| 2009/0186961 | A1 * | 7/2009 | Araujo Da Silva et al. .. 523/150 |

FOREIGN PATENT DOCUMENTS

| | | |
|---|---|---|
| EP | 0735088 | 10/1996 |
| EP | 0810258 | 12/1997 |
| EP | 0 849 333 A | 6/1998 |
| EP | 0881252 | 12/1998 |
| FR | 2 340 323 A | 9/1977 |
| FR | 2 803 300 A | 7/2001 |
| FR | 2 823 215 A | 10/2002 |
| WO | WO 99/02590 | 1/1999 |
| WO | WO 99/06480 | 2/1999 |
| WO | WO 99/28376 | 6/1999 |
| WO | WO 00/05300 | 2/2000 |
| WO | WO 00/05301 | 2/2000 |
| WO | WO 00/73372 | 12/2000 |
| WO | WO 02/10269 | 2/2002 |
| WO | WO 0230939 A1 * | 4/2002 |
| WO | WO 02/053634 | 7/2002 |
| WO | WO 03/002648 | 1/2003 |
| WO | WO 03/002649 | 1/2003 |
| WO | WO 03/016387 A1 | 2/2003 |
| WO | WO 2004/003067 | 1/2004 |
| WO | WO 2004/056915 | 7/2004 |
| WO | WO 2004/056918 A | 7/2004 |

OTHER PUBLICATIONS

"Rubber Compounding: Chemistry and Applications", Marcel Dekker, NY (2004), Rogers, pp. 509-512.
"Processing Technology of Silica Reinforced SBR", PPG Industries, Inc. PA Elastometrics, (Mar. 1981), N. L. Hewitt pp. 33-37.
"Mechanical Properties of Silane-Treated Particle-Filled Polyisoprene Composites: Influence of the Alkoxy Group Mixing Ratio in Silane Coupling Agent Containing Mercapto Group,"Journal of Applied Polimer SCI, Oct. 2012, Yoshinobu Nakamura et al.

* cited by examiner

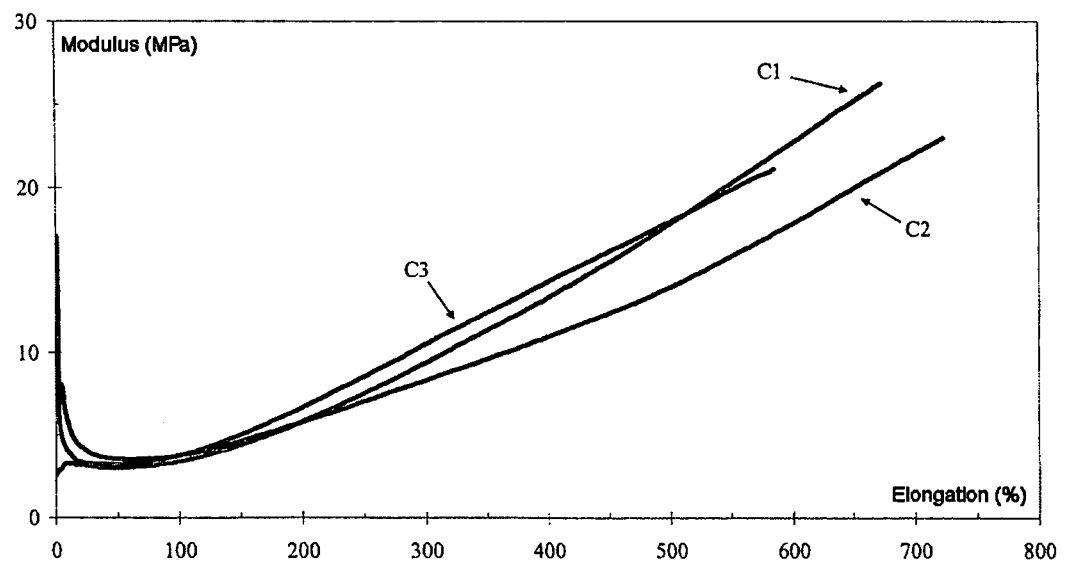

RUBBER COMPOSITION FOR TIRE COMPRISING AN ORGANOSILICON COUPLING SYSTEM

The present invention relates to diene elastomer compositions reinforced with an inorganic filler, such as silica, intended for the manufacture of tyres or tyre semi-finished products, in particular for the treads of these tyres.

It relates more particularly to the coupling agents intended to provide the bonding, in such compositions, between these diene elastomers and these reinforcing inorganic fillers.

Major efforts have been made by tyre designers, so as to reduce the consumption of fuel and the pollution emitted by motor vehicles, in order to obtain tyres exhibiting both a very low rolling resistance, an improved grip, both on a dry surface and on a wet or snowy surface, and a good wear resistance.

This has been made possible in particular by virtue of the development of novel elastomer compositions reinforced with specific inorganic fillers, described as "reinforcing", which exhibit a high dispersibility, which are capable of competing with conventional carbon black from the reinforcing viewpoint and which additionally afford these compositions a reduced hysteresis synonymous with a lower rolling resistance for the tyres comprising them. Such rubber compositions, comprising reinforcing inorganic fillers, for example of the silica or alumina type, have been described, for example, in Patents or Patent Applications EP 501 227 or U.S. Pat. No. 5,227,425, EP 735 088 or U.S. Pat. No. 5,852,099, EP 810 258 or U.S. Pat. No. 5,900,449, EP 881 252, WO99/02590, WO99/06480, WO00/05300, WO00/05301 and WO02/10269.

The processability of the rubber compositions comprising such fillers nevertheless remains more difficult than for the rubber compositions conventionally comprising carbon black as filler. In particular, it is necessary to use a coupling agent, also referred to as bonding agent, the role of which is to provide the connection between the surface of the particles of inorganic filler and the elastomer while facilitating the dispersion of this inorganic filler within the elastomeric matrix.

It should be remembered here that (inorganic filler/elastomer) "coupling" agent has to be understood, in a known way, as meaning an agent capable of establishing a satisfactory connection, of chemical and/or physical nature, between the inorganic filler and the diene elastomer.

Such a coupling agent, which is at least bifunctional, has as simplified general formula "Y—W—X", in which:
  Y represents a functional group ("Y" functional group) which is capable of being physically and/or chemically bonded to the inorganic filler, it being possible for such a bond to be established, for example, between a silicon atom of the coupling agent and the surface hydroxyl (OH) groups of the inorganic filler (for example, the surface silanols, when silica is concerned);
  X represents a functional group ("X" functional group) capable of being physically and/or chemically bonded to the diene elastomer, for example via a sulphur atom;
  W represents a divalent group which makes it possible to connect "Y" and "X".

The coupling agents should in particular not be confused with simple covering agents for the inorganic filler which, in a known way, may comprise the "Y" functional group, active with regard to the inorganic filler, but are in all cases devoid of the "X" functional group, active with regard to the diene elastomer.

Coupling agents, in particular (silica/diene elastomer) coupling agents, have been described in a large number of patent documents, the most well known being silane bifunctional sulphides, in particular alkoxysilanes, regarded today as the products contributing, for vulcanisates comprising silica as filler, the best compromise in terms of scorch safety, of ease of processability and of reinforcing power. Mention should very particularly be made, among these silane sulphides, of bis(3-triethoxysilylpropyl) tetrasulphide (abbreviated to TESPT), the reference coupling agent in tyres with a low rolling resistance described as "Energy-saving Green Tyres".

A search is still underway today to improve the performance of these coupling agents for inorganic fillers, such as silica.

The need is present in particular in the case of rubber matrices based on an isoprene elastomer, such as those used in the treads of tyres for heavy-duty vehicles, in which, in a known way, an effective bond which the elastomer is much more difficult to obtain in comparison with the use of carbon black.

On continuing their research, the Applicant Companies have discovered a novel coupling system which, by virtue of the combination of two very different types of bonding agents, makes it possible to very substantially improve the coupling performance on an isoprene elastomer.

Consequently, a first subject-matter of the invention is a rubber composition intended for the manufacture of tyres based on at least one isoprene elastomer, an inorganic filler as reinforcing filler and an (inorganic filler/isoprene elastomer) coupling system which provides the bonding between the inorganic filler and the isoprene elastomer, the said composition being characterized in that the said coupling system comprises:
  as first coupling agent, a silane sulphide compound (hereinafter "Compound I");
  as second coupling agent, an at least bifunctional organosilicon compound (hereinafter "Compound II") which can be grafted, on the one hand, to the inorganic filler by means of a silyl functional group G and, on the other hand, to the elastomer by means of an azodicarbonyl functional group, the said organosilicon compound having the formula:

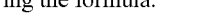

A-CO—N=N—CO-Z-G in which:
  G is the silyl functional group bearing a hydroxyl or hydrolysable group attached to a silicon atom of the compound;
  Z is a divalent bonding group connecting the azodicarbonyl functional group to the silyl functional group;
  A represents a monovalent hydrocarbon group or the group of formula Z'-G' in which:
    Z', which is identical to or different from Z, is a divalent bonding group which makes it possible to connect the azodicarbonyl functional group to another silyl functional group G';
    G', which is identical to or different from G, is a silyl functional group bearing another hydroxyl or hydrolysable group attached to a silicon atom;
  A, Z and if applicable Z', independently, may comprise a heteroatom.

Such a coupling system makes it possible to further and significantly lower the hysteresis of the rubber compositions and consequently the rolling resistance of the tyres and the energy consumption of the motor vehicles equipped with such tyres.

Another subject-matter of the invention is a process for preparing a rubber composition intended for the manufacture of tyres or of tyre semi-finished products exhibiting an improved hysteresis, this composition being based on an isoprene elastomer, on a reinforcing inorganic filler and on a coupling system, the said process comprising the following stages:

incorporating in an isoprene elastomer, during a first "non-productive" stage, at least one reinforcing inorganic filler and all or a first portion of a coupling system which provides the bonding between the said reinforcing inorganic filler and the isoprene elastomer, the combined mixture being kneaded thermomechanically, in one or more stages, until a maximum temperature of between 110° C. and 190° C. is reached;

cooling the mixture to a temperature of less than 100° C.;

subsequently incorporating, during a second "productive" stage, if applicable the second portion of the coupling system and then a crosslinking (or vulcanizing) system;

kneading the entire mixture until a maximum temperature of less than 120° C. is reached, and being characterized in that the said coupling system comprises, in combination, the above Compounds I and II.

Another subject-matter of the invention is the use of a composition according to the invention for the manufacture of tyres or of semi-finished products made of rubber intended for these tyres, these semi-finished products being chosen in particular from the group consisting of treads, crown reinforcement plies, side walls, carcass reinforcement plies, beads, protectors, underlayers, rubber blocks and other internal rubbers, in particular decoupling rubbers, intended to provide the bonding or the interface between the abovementioned regions of the tyres.

Another subject-matter of the invention is these tyres and these semi-finished products themselves when they comprise a rubber composition in accordance with the invention. The invention relates in particular to tyre treads, it being possible for these treads to be used during the manufacture of new tyres or for the retreading of waste tyres; by virtue of the compositions of the invention, these treads exhibit both high wear resistance and reduced rolling resistance.

The composition in accordance with the invention is particularly suitable for the manufacture of tyres or of tyre treads intended for equipping passenger vehicles, vans, for 4×4 (4-wheel drive) vehicles, two-wheel vehicles, heavy-duty vehicles, that is to say underground, bus, heavy road transport vehicles (lorries, tractors, trailers) or off-road vehicles, aircraft, earthmoving equipment, heavy agricultural vehicles or handling vehicles.

The invention and its advantages will be easily understood in the light of the description and of the exemplary embodiments which follow as well as of the single appended FIGURE, which reproduces curves of variation in modulus as a function of the elongation for different rubber compositions which are or are not in accordance with the invention.

I. Measurements And Tests Used

The rubber compositions are characterized, before and after curing, as indicated below.

I-1. Rheometry:

The measurements are carried out at 150° C. with an oscillating disc rheometer, according to Standard DIN 53529-part 3 (June 1983). The change in the rheometric torque as a function of time describes the change in the stiffening of the composition as a result of the vulcanization reaction. The measurements are processed according to Standard DIN 53529-part 2 (March 1983): Ti is the induction time, that is to say the time necessary at the starting of the vulcanization reaction; $T_\alpha$ (for example $T_{99}$) is the time necessary to achieve a conversion of $\alpha$ %, that is to say $\alpha$ % (for example 99%) of the difference between the minimum and maximum torques. The conversion rate constant, recorded as K (expressed as $min^{-1}$), which is first order, calculated between 30% and 80% conversion, which makes it possible to assess the vulcanization kinetics, is also measured.

I-2. Tensile Tests

These tests make it possible to determine the elasticity stresses and the properties at break. Unless otherwise indicated, they are carried out in accordance with French Standard NF T 46-002 of September 1988. The nominal secant moduli (or apparent stresses, MPa) are measured in second elongation (i.e., after a cycle of accommodation) at 10% elongation (recorded as M10), 100% elongation (M100) and 300% elongation (M300). The breaking stresses (in MPa) and the elongations at break (in %) are also measured.

Processing the tensile recordings also makes it possible to plot the curve of modulus as a function of the elongation (see appended FIGURE), the modulus used here being the true secant modulus measured in first elongation, calculated by reducing to the real section of the test specimen and not to the initial section as previously for nominal moduli.

I-3. Dynamic Properties

The dynamic properties $\Delta G^*$ and $\tan(\delta)_{max}$ are measured on a viscosity analyser (Metravib VA4000) according to Standard ASTM D 5992-96. The response of a sample of vulcanized composition (cylindrical test specimen with a thickness of 4 mm and with a cross section of 400 $mm^2$), subjected to a simple alternating sinusoidal shear stress, at a frequency of 10 Hz, at 60° C. is recorded. A strain amplitude sweep is carried out from 0.1% to 50% (outward cycle) and then from 50% to 1% (return cycle). The results made use of are the complex dynamic shear modulus (G*) and the loss factor tan δ. The maximum value of tan δ observed ($\tan(\delta)_{max}$) and the difference in complex modulus ($\Delta G^*$) between the values at 0.1% and at 50% strain (Payne effect) are shown for the return cycle.

II. Detailed Description of the Invention

The rubber compositions according to the invention are based on at least an (that is to say at least one) isoprene elastomer; an (at least one) inorganic filler as reinforcing filler; and a coupling system comprising Compounds I and II, described in detail below, which provide the bonding between the said inorganic filler and the isoprene elastomer.

Of course, the expression composition "based on" is to be understood as meaning a composition comprising the mixture and/or the reaction product of the various constituents used, some of these base constituents (for example, the coupling system and the reinforcing inorganic filler) being capable of reacting or intended to react together, at least in part, during the various phases of manufacture of the compositions, in particular during their vulcanization (curing).

In the present description, unless expressly indicated otherwise, all the percentages (%) indicated are % by weight.

II-1. Isoprene Elastomer

It should be remembered first of all that the term "diene" elastomer (or rubber, the two terms being regarded here as synonymous) should be understood as meaning by definition an elastomer resulting at least in part (i.e., a homopolymer or a copolymer) from diene monomers, that is to say from monomers bearing two carbon-carbon double bonds which may or may not be conjugated. The term "essentially unsaturated" diene elastomer is understood here to mean a diene elastomer resulting at least in part from conjugated diene monomers having a level of units of diene origin (conjugated dienes) which is greater than 15% (mol %). In the category of "essentially unsaturated" diene elastomers, the term "highly unsaturated" diene elastomer is understood to mean in particular a diene elastomer having a level of units of diene origin (conjugated dienes) which is greater than 50%.

Given these general definitions, the term "isoprene elastomer" is understood to mean, in the present patent application, in a known way, an isoprene homopolymer or copolymer, in other words a diene elastomer chosen from the group consisting of natural rubber (NR), synthetic polyisoprenes (IR), the various copolymers of isoprene and the blends of these elastomers. Mention will in particular be made, among isoprene copolymers, of isobutene/isoprene copolymers (butyl rubber-IIR), isoprene/styrene copolymers (SIR), isoprene/butadiene copolymers (BIR) or isoprene/butadiene/styrene copolymers (SBIR).

This isoprene elastomer is preferably natural rubber or a synthetic polyisoprene of the cis-1,4 type. Use is preferably made, among these synthetic polyisoprenes, of polyisoprenes having a level (mol %) of cis-1,4 bonds of greater than 90%, more preferably still of greater than 98%.

The compositions of the invention may contain, as a blend with the above isoprene elastomer, diene elastomers other than isoprene elastomers, as the minor component (i.e., for less than 50% by weight) or as the major component (i.e., for more than 50% by weight), according to the applications targeted. They might also comprise non-diene elastomers, indeed even polymers other than elastomers, for example thermoplastic polymers. Mention will in particular be made, as examples of such nonisoprene diene elastomers, of any highly unsaturated diene elastomer chosen in particular from the group consisting of polybutadienes (BR), butadiene copolymers, in particular styrene/butadiene copolymers (SBR), and the blends of these various elastomers.

The improvement in the coupling contributed by the invention is particularly notable with regard to rubber compositions for which the elastomeric base is composed predominantly (i.e., to more than 50% by weight) of polyisoprene, i.e., natural rubber or synthetic polyisoprene.

The composition in accordance with the invention is intended in particular for a tyre tread, whether a new tyre or a waste tyre (retreading), in particular for a tyre intended for commercial or utility vehicles, such as heavy-duty vehicles, i.e. underground, bus, heavy road transport vehicles (lorries, tractors, trailers) or off-road vehicles.

In such a case, the best embodiment known of the invention consists in using, as isoprene elastomer, solely polyisoprene, more preferably natural rubber. It is for such conditions that the best performance in terms of rolling resistance and wear resistance has been observed.

However, a person skilled in the art of tyres will understand that the various blends between isoprene elastomer, in particular natural rubber, and other diene elastomers, in particular SBR and/or BR, are also possible in rubber compositions in accordance with the invention which can be used, for example, for various parts of the tyre other than its tread, for example crown reinforcement plies (for example working plies, protection plies or hooping plies), carcass reinforcement plies, side walls, beads, protectors, underlayers, rubber blocks and other internal rubbers providing the interface between the abovementioned regions of the tyres.

According to another preferred embodiment of the invention, in particular when it is intended for a tyre side wall or for an airtight internal rubber of a tubeless tyre (or other air-impermeable component), the composition in accordance with the invention may contain at least one essentially saturated diene elastomer, in particular at least one EPDM copolymer or one butyl rubber (optionally chlorinated or brominated), whether these copolymers are used alone or as a blend with highly unsaturated diene elastomers as mentioned above, in particular NR or IR, BR or SBR.

II-2. Reinforcing Inorganic Filler

The term "reinforcing inorganic filler" is to be understood as meaning here, in a known way, any inorganic or mineral filler, whatever its colour and its origin (natural or synthetic), also known as "white" filler, "clear" filler or even "nonblack" filler, in contrast with carbon black, this inorganic filler being capable of reinforcing, by itself alone, without means other than an intermediate coupling agent, a rubber composition intended for the manufacture of a tyre tread, in other words capable of replacing, in its reinforcing role, a conventional tyre-grade carbon black for a tread. Such a filler is generally characterized by the presence of functional groups, in particular hydroxyl (—OH) groups, at its surface, thus requiring the use of a coupling agent or system intended to provide a stable chemical bond between the isoprene elastomer and the said filler.

Preferably, the reinforcing inorganic filler is a filler of the siliceous or aluminous type or a mixture of these two types of fillers.

The silica ($SiO_2$) used can be any reinforcing silica known to a person skilled in the art, in particular any precipitated or pyrogenic silica exhibiting a BET specific surface and a CTAB specific surface which are both less than 450 $m^2/g$, preferably from 30 to 400 $m^2/g$. Highly dispersible precipitated silicas ("HDSs") are preferred, in particular when the invention is employed for the manufacture of tyres exhibiting a low rolling resistance; mention may be made, as examples of such silicas, of the Ultrasil 7000 silicas from Degussa, the Zeosil 1165 MP, 1135 MP and 1115 MP silicas from Rhodia, the Hi-Sil EZ150G silica from PPG, the Zeopol 8715, 8745 or 8755 silicas from Huber or the silicas as described in Application WO 03/016387.

The reinforcing alumina ($Al_2O_3$) preferably used is a highly dispersible alumina having a BET specific surface ranging from 30 to 400 $m^2/g$, more preferably between 60 and 250 $m^2/g$, and a mean particle size at most equal to 500 nm, more preferably at most equal to 200 nm. Mention may in particular be made, as nonlimiting examples of such reinforcing aluminas, of the "Baikalox A125" or "CR125" (Baïkowski), "APA-100RDX" (Condea), "Aluminoxide C" (Degussa) or "AKP-G015" (Sumitomo Chemicals) aluminas.

Mention may also be made, as other examples of inorganic filler capable of being used in the rubber compositions of the invention, of aluminium (oxide) hydroxides, aluminosilicates, titanium oxides, silicon carbides or nitrides, all of the reinforcing type as described, for example, in Applications WO 99/28376, WO 00/73372, WO 02/053634, WO 2004/003067 and WO 2004/056915.

When the treads of the invention are intended for tyres with a low rolling resistance, the reinforcing inorganic filler used, in particular if it is silica, preferably has a BET specific surface of between 60 and 350 $m^2/g$. An advantageous embodiment of the invention consists in using a reinforcing inorganic filler, in particular a silica, having a high BET specific surface within a range from 130 to 300 $m^2/g$, due to the high reinforcing power recognized for such fillers. According to another preferred embodiment of the invention, use may be made of a reinforcing inorganic filler, in particular a silica, exhibiting a BET specific surface of less than 130 $m^2/g$, preferably in such a case of between 60 and 130 $m^2/g$ (see, for example, Applications WO03/002648 and WO03/002649).

The physical state under which the reinforcing inorganic filler is provided is not important, whether it is in the form of a powder, of microbeads, of granules, of balls or any other appropriate densified form. Of course, the term reinforcing inorganic filler is also understood to mean mixtures of different reinforcing inorganic fillers, in particular of highly dispersible siliceous and/or aluminous fillers as described above.

A person skilled in the art will know how to adjust the level of reinforcing inorganic filler according to the nature of the inorganic filler used and according to the type of tyre concerned, for example a tyre for a motorcycle, for a passenger vehicle or for a utility vehicle, such as a van or a heavy-duty vehicle. Preferably, this level of reinforcing inorganic filler will be chosen between 20 and 200 phr, more preferably between 30 and 150 phr, in particular greater than 40 phr (for example between 40 and 120 phr, in particular between 40 and 80 phr).

In the present account, the BET specific surface is determined in a known way by gas adsorption using the Brunauer-Emmett-Teller method described in "*The Journal of the American Chemical Society*", Vol. 60, page 309, February 1938, more specifically according to French Standard NF ISO 9277 of December 1996 (multipoint volumetric method (5 points)—gas: nitrogen—degassing: 1 hour at 160° C.—relative pressure range p/po: 0.05 to 0.17). The CTAB specific surface is the external surface determined according to French Standard NF T 45-007 of November 1987 (method B).

Finally, a person skilled in the art will understand that a reinforcing filler of another nature, in particular an organic filler, might be used as equivalent filler to the reinforcing inorganic filler described in the present section, provided that this reinforcing filler is covered with an inorganic layer, such as silica, or else comprises, at its surface, functional sites, in particular hydroxyl sites, requiring the use of a coupling agent in order to establish the bonding between the filler and the elastomer.

II-3. Coupling System

As explained above, an (inorganic filler/diene elastomer) coupling agent carries, in a known way, at least two functional groups, recorded here as "Y" and "X", which allow it to be able to be grafted, on the one hand, to the reinforcing inorganic filler by means of the "Y" functional group, for example a hydroxyl group or a hydrolysable group, and, on the other hand, to the diene elastomer by means of the "X" functional group, for example a sulphur-comprising functional group.

The coupling system used in accordance with the invention has the essential characteristic of comprising, in combination, two polyfunctional (at least bifunctional) (inorganic filler/isoprene elastomer) coupling agents, Compound I and Compound II, both of the organosilicon type.

A) Compound I

Compound I is a silane sulphide, of the monosulphide as polysulphide type (including disulphide). The bifunctional silane sulphides which can be used as coupling agent in diene elastomer compositions reinforced with an inorganic filler, such as silica, are well known to a person skilled in the art.

Use is preferably made of a silane belonging to the family of the silane polysulphides, referred to as "symmetrical" or "asymmetrical" according to their specific structure, such as described, for example, in the abovementioned Applications WO 03/002648 and WO 03/002649.

Particularly suitable, without the definition below being limitative, are what are called "symmetrical" polysulphurised silanes which satisfy the following general formula (I):

$$Y^1-Z^1-S_x-Z^2-Y^2 \quad (I)$$

in which:
x is an integer from 2 to 8, preferably from 2 to 5;

$Z^1$ and $Z^2$, which are identical or different, each represent a divalent hydrocarbon radical comprising from 1 to 18 carbon atoms;

$Y^1$ and $Y^2$, which are identical or different, each correspond to one of the following formulae:

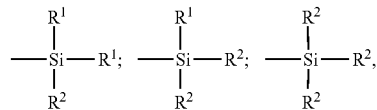

in which:
the $R^1$ radicals, which are unsubstituted or substituted and identical to or different from one another, represent a $C_1$-$C_{18}$ alkyl, $C_5$-$C_{18}$ cycloalkyl or $C_6$-$C_{18}$ aryl group;
the $R^2$ radicals, which are unsubstituted or substituted and identical to or different from one another, represent a hydroxyl, $C_1$-$C_{18}$ alkoxyl or $C_5$-$C_{18}$ cycloalkoxyl group;

In the case of a mixture of silane polysulphides corresponding to the above formula (I), in particular the usual mixtures available commercially, the mean value of the "x" indices is a fractional number preferably of between 2 and 5, more preferably in the vicinity of 4. However, the invention can also advantageously be carried out, for example, with silane disulphides (x=2).

$Z^1$ and $Z^2$ are preferably chosen from the group consisting of $C_1$-$C_{18}$ alkylenes and $C_6$-$C_{12}$ arylenes, more preferably from $C_1$-$C_{10}$ alkylenes, in particular $C_1$-$C_4$ alkylenes; more preferably still, $Z^1$ and $Z^2$ represent propylene.

The $R^1$ radicals, which are unsubstituted or substituted and identical to or different from one another, are preferably chosen from $C_1$-$C_6$ alkyls, cyclohexyl and phenyl, more preferably from $C_1$-$C_4$ alkyls; more preferably still, $R^1$ represents methyl.

The $R^2$ radicals, which are unsubstituted or substituted and identical to or different from one another, are preferably chosen from hydroxyl, $C_1$-$C_8$ alkoxyls and $C_5$-$C_8$ cycloalkoxyls, more preferably from hydroxyl and $C_1$-$C_4$ alkoxyl; more preferably still, $R^2$ is chosen from the group consisting of hydroxyl, methoxyl and ethoxyl.

Mention will more particularly be made, as examples of silane polysulphides, of bis(($C_1$-$C_4$)alkoxyl-($C_1$-$C_4$)alkyl-silyl-($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl) tetrasulphide, abbreviated to TESPT, of formula $[(C_2H_5O)_3Si(CH_2)_3S_2]_2$, or bis(triethoxysilylpropyl) disulphide, abbreviated to TESPD, of formula $[(C_2H_5O)_3Si(CH_2)_3S]_2$.

TESPD is sold, for example, by Degussa under the name Si75 (in the form of a mixture of disulphide (at 75% by weight) and of polysulphides) or also by Witco under the name Silquest A1589. TESPT is sold, for example, by Degussa under the name Si69 (or X50S, where it is supported at 50% by weight on carbon black) or also by Osi Specialties under the name Silquest A1289 (in both cases, commercial mixture of polysulphides with a mean value for x which is close to 4).

Mention will also be made, as other examples of coupling agents which are particularly preferred, of bis(mono($C_1$-$C_4$) alkoxyldi($C_1$-$C_4$)alkylsilylpropyl) polysulphides (in particular disulphides, trisulphides or tetrasulphides), more particularly bis(monoethoxydimethylsilyl-propyl) tetrasulphide or disulphide, respectively MESPT of formula $[(CH_3)_2(C_2H_5O)$ Si(CH$_2$)$_3$S$_2$]$_2$ and MESPD of formula [(CH$_3$)$_2$(C$_2$H$_5$O)Si(CH$_2$)$_3$S]$_2$, as described in Application WO 02/083782.

Mention will in particular be made, as examples of coupling agents which are particularly preferred other than the abovementioned alkoxysilane polysulphides, of bifunctional polyorganosiloxanes or also of hydroxysilane polysulphides (R$^2$=OH in the above formula I), in particular of hydroxymethylsilane polysulphides (R$^1$=methyl in the formula I), as described in Applications WO 02/30939 and WO 02/31041.

B) Compound II

Compound II is a polyfunctional (at least bifunctional) organosilicon compound which can be grafted, on the one hand, to the reinforcing inorganic filler by means of a (at least one) silyl functional group G and, on the other hand, to the isoprene elastomer by means of a (at least one) azodicarbonyl functional group, the said organosilicon compound having the formula:

A-CO—N=N—CO-Z-G  (II)

in which:

G is the silyl functional group bearing a (at least one) hydroxyl or hydrolysable group attached to a silicon atom of the compound;

Z is a divalent bonding group connecting the azodicarbonyl functional group to the silyl functional group;

A represents a monovalent hydrocarbon group or the group of formula Z'-G' in which:

Z', which is identical to or different from Z, is a divalent bonding group which makes it possible to connect the azodicarbonyl functional group to another silyl functional group G';

G', which is identical to or different from G, is a silyl functional group bearing another (at least one other) hydroxyl or hydrolysable group attached to a silicon atom (identical to or different from that of the G group);

A, Z and if applicable Z', independently, may comprise a heteroatom.

It should be remembered here that, according to definitions well known to a person skilled in the art:

the term "organosilicon" compound should be understood as meaning an organic compound including at least one carbon-silicon bond;

the term "silyl" group should be understood as meaning a group bearing a single (it is then described as monosilyl) or several (it is then described as polysilyl) silicon atom(s).

In the above formula (II), a person skilled in the art will immediately understand that the functional group (recorded as "X" in the introduction to the present patent application) intended to provide the bonding with the isoprene elastomer is provided by the central azodicarbonyl (—CO—N=N—CO—) group, while the functional group (recorded as "Y" in the introduction to the present patent application) intended to provide the bonding with the reinforcing inorganic filler is provided by the silyl group G, which thus has the essential characteristic of bearing a (at least one) hydroxyl or hydrolysable group attached to its silicon atom (if this group G is of the monosilyl type) or to at least one of its silicon atoms (if this group G is of the polysilyl type).

The monovalent hydrocarbon group which can be represented by A can be linear or branched aliphatic, or carbocyclic, in particular aromatic; it can be substituted or unsubstituted and saturated or unsaturated.

The divalent group Z, preferably comprising from 1 to 18 carbon atoms, preferably connects the azodicarbonyl functional group to the silyl functional group G via a silicon atom, it being possible for the latter to be identical to or different from the silicon atom to which the hydroxyl or hydrolysable group is attached. Z is preferably chosen from saturated or unsaturated aliphatic hydrocarbon groups, saturated, unsaturated and/or aromatic, monocyclic or polycyclic, carbocyclic groups and groups exhibiting a saturated or unsaturated aliphatic hydrocarbon part and a carbocyclic part as defined above. It more preferably represents an alkylene chain, a saturated cycloalkylene group, an arylene group or a divalent group composed of a combination of at least two of these groups.

In the present description, the term aliphatic hydrocarbon group is understood to mean an optionally substituted linear or branched group preferably comprising from 1 to 18 carbon atoms. Advantageously, the said aliphatic hydrocarbon group comprises from 1 to 12 carbon atoms, better still from 1 to 8 carbon atoms and more preferably still from 1 to 6 carbon atoms.

Mention may be made, as saturated aliphatic hydrocarbon group, of alkyl groups, such as methyl, ethyl, propyl, isopropyl, n-butyl, isobutyl, t-butyl, pentyl, isopentyl, neopentyl, 2-methylbutyl, 1-ethylpropyl, hexyl, isohexyl, neohexyl, 1-methylpentyl, 3-methylpentyl, 1,1-dimethylbutyl, 1,3-dimethylbutyl, 2-ethylbutyl, 1-methyl-1-ethylpropyl, heptyl, 1-methylhexyl, 1-propylbutyl, 4,4-dimethylpentyl, octyl, 1-methylheptyl, 2-ethylhexyl, 5,5-dimethylhexyl, nonyl, decyl, 1-methylnonyl, 3,7-dimethyloctyl, 7,7-dimethyloctyl and hexadecyl.

The unsaturated aliphatic hydrocarbon groups which can be used comprise one or more unsaturations, preferably one, two or three unsaturations of ethylenic (double bond) and/or acetylenic (triple bond) type. Examples thereof are the alkenyl or alkynyl groups deriving from the alkyl groups defined above by removal of two or more hydrogen atoms. Preferably, the unsaturated aliphatic hydrocarbon groups comprise a single unsaturation.

The term carbocyclic radical is understood to mean an optionally substituted, preferably C$_3$-C$_{50}$, monocyclic or polycyclic radical. Advantageously, it is a C$_3$-C$_{18}$ radical which is preferably mono-, bi- or tricyclic. When the carbocyclic radical comprises more than one cyclic nucleus (case of polycyclic carbocycles), the cyclic nuclei are fused in pairs. Two fused nuclei can be ortho-fused or peri-fused. The carbocyclic radical may comprise, unless otherwise indicated, a saturated part and/or an aromatic part and/or an unsaturated part.

Examples of saturated carbocyclic radicals are cycloalkyl groups. Preferably, the cycloalkyl groups are C$_3$-C$_{18}$, better still C$_5$-C$_{10}$, cycloalkyl groups. Mention may in particular be made of the cyclopentyl, cyclohexyl, cycloheptyl, cyclooctyl, adamantyl or norbornyl radicals. The unsaturated carbocycle or any unsaturated part of carbocyclic type exhibits one or more ethylenic unsaturations, preferably one, two or three. It advantageously comprises from 6 to 50 carbon atoms, better still from 6 to 20 carbon atoms, for example from 6 to 18 carbon atoms. Examples of unsaturated carbocycles are C$_6$-C$_{10}$ cycloalkenyl groups. Examples of aromatic carbocyclic radicals are C$_6$-C$_{18}$ aryl groups and in particular phenyl, naphthyl, anthryl and phenanthryl.

A group exhibiting both an aliphatic hydrocarbon part as defined above and a carbocyclic part as defined above is, for example, an arylalkyl group, such as benzyl, or an alkylaryl group, such as tolyl.

The substituents of the aliphatic hydrocarbon groups or parts and of the carbocyclic groups or parts are, for example, alkoxyl groups in which the alkyl part is preferably as defined above.

The Z' and G' groups have the same preferred definitions and characteristics as those described above for the Z and G groups.

Z' can be identical to Z or different from the latter; it makes it possible to connect the azodicarbonyl functional group to a second silyl functional group G' bearing a (at least one) second hydroxyl or hydrolysable group attached to a (at least one) silicon atom, identical to or different from that of the G group, it being possible for G' to be itself identical to G or different from the latter.

According to a particularly preferred embodiment, at least one of the A, Z and, if applicable, Z' groups comprises a (at least one) heteroatom preferably chosen from O, S and N. This heteroatom is preferably connected directly to the adjacent carbonyl bond.

When such a heteroatom is carried by the monovalent hydrocarbon radical A, it is preferably carried in the form of a monovalent hydrocarbon residue chosen from —OR, —NR and —SR (R being any monovalent hydrocarbon radical preferably comprising from 1 to 18 carbon atoms), the free valency of which is more preferably directly connected to the adjacent carbonyl bond; the —OR residue is preferred, with R representing a $C_1$-$C_6$ alkyl, preferably a $C_1$-$C_4$ alkyl (methyl, ethyl, propyl, butyl), more preferably a $C_1$ alkyl (methyl) or a $C_2$ alkyl (ethyl).

When such a heteroatom is carried by Z and/or, if applicable, Z' (i.e., by Z only, by Z' only or by both), it is preferably carried in the form of a divalent hydrocarbon residue chosen from the —R'—NH—; —R'—O—; and —R'—S— residues (R' being any divalent hydrocarbon radical preferably comprising from 1 to 18 carbon atoms); the —R'—NH— residue is preferred, with R' representing a $C_1$-$C_6$ alkylene, preferably a $C_1$-$C_4$ alkylene (methylene, ethylene, propylene, butylene), more preferably a $C_3$ alkylene (propylene).

According to a particularly preferred embodiment, Compound II is an organosilane, the silyl group G of which preferably corresponds to one of the formulae below:

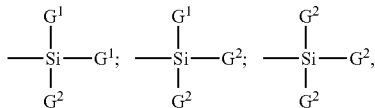

in which:
the $G^1$ radicals, which are substituted or unsubstituted and which are identical to or different from one another, are chosen from the group consisting of $C_1$-$C_{18}$ alkyls, $C_5$-$C_{18}$ cycloalkyls and $C_6$-$C_{18}$ aryls;
the $G^2$ radicals, which are substituted or unsubstituted and which are identical to or different from one another, are chosen from the group consisting of hydroxyl, $C_1$-$C_{18}$ alkoxyls and $C_5$-$C_{18}$ cycloalkoxyls.

In other words, the preferred Compound II above corresponds to the formula:

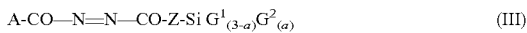

in which:
a is an integer equal to 1, 2 or 3;
A, Z, $G^1$ and $G^2$ have the definitions given above.

An alternative form of Compound II of formula (III) consists of an azosilanedicarbonyl of the "symmetrical" type of formula:

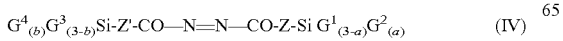

in which:

b, which is identical to or different from a, is an integer equal to 1, 2 or 3;
$G^3$ and $G^4$, which are respectively identical to or different from $G^1$ and $G^2$, have the same definitions as those given above, respectively, for $G^1$ and $G^2$
Z', which is identical to or different from Z, has the same definition as that given above for Z.

According to a preferred embodiment, at least one, more preferably all, of the following characteristics is/are confirmed in the formulae (III) and (IV) above and in the formulae (V) to (X) which follow:
the $G^1$ and $G^3$ radicals, which are identical to or different from one another, are chosen from the group consisting of $C_1$-$C_6$ alkyl groups, the cyclohexyl group and the phenyl group;
the $G^2$ and $G^4$ radicals, which are identical to or different from one another, are chosen from the group consisting of the hydroxyl group, $C_1$-$C_8$ alkoxyl groups and $C_5$-$C_8$ cycloalkoxyl groups.

According to a more preferred embodiment, at least one, more preferably all, of the following characteristics is/are confirmed in the formulae (III) and (IV) above and in the formulae (V) to (X) which follow:
the $G^1$ and $G^3$ radicals are chosen from $C_1$-$C_4$ alkyls, more particularly from methyl and ethyl;
the $G^2$ and $G^4$ radicals are chosen from hydroxyl and $C_1$-$C_4$ alkoxyls, more particularly from hydroxyl, methoxyl and ethoxyl.

According to a particularly preferred embodiment, the following characteristics are confirmed in the formulae (III) and (IV) which precede and in the formulae (V) to (X) which follow:
Z (and, if applicable, Z') is a $C_1$-$C_{10}$ alkylene comprising a heteroatom preferably chosen from O, S and N;
more preferably, Z (and, if applicable, Z') is a divalent radical chosen from the group consisting of —$(CH_2)_y$—, —NH—$(CH_2)_y$— and —O—$(CH_2)_y$—, y being an integer preferably from 1 to 6, more preferably from 1 to 4, in particular equal to 3.

$G^1$ and $G^2$, on the one hand, and $G^3$ and $G^4$, on the other hand, might also form, together and with the silicon atom which carries them, a monocyclic or polycyclic carbocyclic group having from 2 to 10 cyclic carbon atoms and being able to comprise one or more cyclic heteroatom(s) which is/are oxygen(s). Mention will be made, by way of example, of, for example, the rings:

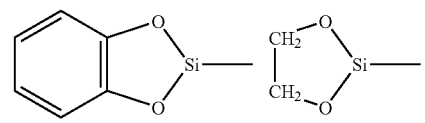

"Symmetric" azosilanes of formula (IV) in which A represents the group of formula Z'-G'(with G'=G) and which correspond to the preferred characteristics set out above are in particular those corresponding to the specific formulae (IV-n) which follow, in which y and y', which are identical or different for the same formula, are integers from 1 to 6, preferably from 1 to 4, more preferably equal to 3 (Z and Z'=propylene):

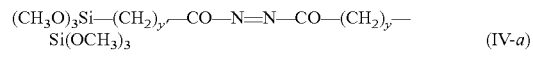

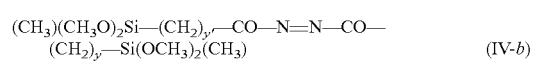

$(CH_3)_2(CH_3O)Si—(CH_2)_y—CO—N=N—CO—(CH_2)_y—Si(OCH_3)(CH_3)_2$ (IV-c)

$(C_2H_5O)_3Si—(CH_2)_y—CO—N=N-CO—(CH_2)_y—Si(OC_2H_5)_3$ (IV-d)

$(CH_3)(C_2H_5O)_2Si—(CH_2)_y—CO—N=N—CO—(CH_2)_y—Si(OC_2H_5)_2(CH_3)$ (IV-e)

$(CH_3)_2(C_2H_5O)Si—(CH_2)_y—CO—N=N—CO—(CH_2)_y—Si(OC_2H_5)(CH_3)_2$ (IV-f)

$(HO)_3Si—(CH_2)_y—CO—N=N—CO—(CH_2)_y—Si(OH)_3$ (IV-g)

$(CH_3)(HO)_2Si—(CH_2)_y—CO—N=N—CO—(CH_2)_y—Si(OH)_2(CH_3)$ (IV-h)

$(CH_3)_2(HO)Si—(CH_2)_y—CO—N=N—CO—(CH_2)_y—Si(OH)(CH_3)_2$ (IV-i)

$(CH_3)(HO)_2Si—(CH_2)_y—CO—N=N—CO—(CH_2)_y—Si(OH)_2(CH_3)$ (IV-j)

$(CH_3)_2(HO)Si—(CH_2)_y—CO—N=N—CO—(CH_2)_y—Si(OH)(CH_3)_2$ (IV-k)

"Asymmetric" azosilanes of formula (III) in which A comprises an oxygen atom as heteroatom and which correspond to the preferred characteristics set out above are in particular those corresponding to the specific formula (V) which follows:

$R—O—CO—N=N—CO-Z-Si\ G^1_{(3-a)}G^2_{(a)}$ (V)

in which:
a, Z, $G^1$ and $G^2$ have the definitions given above;
R represents a $C_1$-$C_6$, preferably $C_1$-$C_4$, alkyl, more preferably methyl or ethyl, by way of example, those corresponding to the specific formulae (V-n) which follow, in which y is an integer from 1 to 6, preferably from 1 to 4, more preferably equal to 3 (Z=propylene):

$CH_3—O—CO—N=N—CO—(CH_2)_y—Si(OCH_3)_3$ (V-a)

$CH_3—O—CO—N=N—CO—(CH_2)_y—Si(OCH_3)_2(CH_3)$ (V-b)

$CH_3—O—CO—N=N—CO—(CH_2)_y—Si(OCH_3)(CH_3)_2$ (V-c)

$C_2H_5—O—CO—N=N—CO—(CH_2)_y—Si(OCH_3)_3$ (V-d)

$C_2H_5—O—CO—N=N—CO—(CH_2)_y—Si(OCH_3)_2(CH_3)$ (V-e)

$C_2H_5—O—CO—N=N—CO—(CH_2)_y—Si(OCH_3)(CH_3)_2$ (V-f)

$CH_3—O—CO—N=N—CO—(CH_2)_y—Si(OC_2H_5)_3$ (V-g)

$CH_3—O—CO—N=N—CO—(CH_2)_y—Si(OC_2H_5)_2(CH_3)$ (V-h)

$CH_3—O—CO—N=N—CO—(CH_2)_y—Si(OC_2H_5)(CH_3)_2$ (V-i)

$C_2H_5—O—CO—N=N—CO—(CH_2)_y—Si(OC_2H_5)_3$ (V-j)

$C_2H_5—O—CO—N=N—CO—(CH_2)_y—Si(OC_2H_5)_2(CH_3)$ (V-k)

$C_2H_5—O—CO—N=N—CO—(CH_2)_y—Si(OC_2H_5)(CH_3)_2$ (V-l)

$C_2H_5—O—CO—N=N—CO—(CH_2)_y—Si(OH)_3$ (V-m)

$CH_3—O—CO—N=N—CO—(CH_2)_y—Si(OH)_3$ (V-n)

$CH_3—O—CO—N=N—CO—(CH_2)_y—Si(OH)_2(CH_3)$ (V-o)

$CH_3—O—CO—N=N—CO—(CH_2)_y—Si(OH)(CH_3)_2$ (V-p)

$C_2H_5—O—CO—N=N—CO—(CH_2)_y—Si(OH)_2(CH_3)$ (V-q)

$C_2H_5—O—CO—N=N—CO—(CH_2)_y—Si(OH)(CH_3)_2$ (V-r)

Symmetric or asymmetric azosilane compounds in which Z comprises a nitrogen atom as heteroatom are, for example, those corresponding to the formulae (VI) or (VII) which follow, in which y and y', which are identical or different for the same formula, are integers from 1 to 6, preferably from 1 to 4, more preferably equal to 3:

$A-CO—N=N—CO—NH—(CH_2)_y—Si\ G^1_{(3-a)}G^2_{(a)}$ (VI)

$G^4_{(b)}G^3_{(3-b)}Si—(CH_2)_{y'}—HN—CO—N=N—CO—NH—(CH_2)_y—Si\ G^1_{(3-a)}G^2_{(a)}$ (VII)

Specific examples of compounds of formula (VI) are those of formulae (VI-n):

$CH_3—O—CO—N=N—CO—NH—(CH_2)_y—Si(OCH_3)_3$ (VI-a)

$CH_3—O—CO—N=N—CO—NH—(CH_2)_y—Si(OCH_3)_2(CH_3)$ (VI-b)

$CH_3—O—CO—N=N—CO—NH—(CH_2)_y—Si(OCH_3)(CH_3)_2$ (VI-c)

$C_2H_5—O—CO—N=N—CO—NH—(CH_2)_y—Si(OCH_3)_3$ (VI-d)

$C_2H_5—O—CO—N=N—CO—NH—(CH_2)_y—Si(OCH_3)_2(CH_3)$ (VI-e)

$C_2H_5—O—CO—N=N—CO—NH—(CH_2)_y—Si(OCH_3)(CH_3)_2$ (VI-f)

$CH_3—O—CO—N=N—CO—NH—(CH_2)_y—Si(OC_2H_5)_3$ (VI-g)

$CH_3—O—CO—N=N—CO—NH—(CH_2)_y—Si(OC_2H_5)_2(CH_3)$ (VI-h)

$CH_3—O—CO—N=N—CO—NH—(CH_2)_y—Si(OC_2H_5)(CH_3)_2$ (VI-i)

$C_2H_5—O—CO—N=N—CO—NH—(CH_2)_y—Si(OC_2H_5)_3$ (VI-j)

$C_2H_5—O—CO—N=N—CO—NH—(CH_2)_y—Si(OC_2H_5)_2(CH_3)$ (VI-k)

$C_2H_5—O—CO—N=N—CO—NH—(CH_2)_y—Si(OC_2H_5)(CH_3)_2$ (VI-l)

$CH_3—O—CO—N=N—CO—NH—(CH_2)_y—Si(OH)_3$ (VI-m)

$CH_3—O—CO—N=N—CO—NH—(CH_2)_y—Si(OH)_2(CH_3)$ (VI-n)

$CH_3—O—CO—N=N—CO—NH—(CH_2)_y—Si(OH)(CH_3)_2$ (VI-o)

C$_2$H$_5$—O—CO—N=N—CO—NH—(CH$_2$)$_y$—Si(OH)$_3$ (VI-p)

C$_2$H$_5$—O—CO—N=N—CO—NH—(CH$_2$)$_y$—Si(OH)$_2$(CH$_3$) (VI-q)

C$_2$H$_5$—O—CO—N=N—CO—NH—(CH$_2$)$_y$—Si(OH)(CH$_3$)$_2$ (VI-r)

Specific examples of compounds of formula (VII) are those of formulae (VII-n):

(CH$_3$O)$_3$Si—(CH$_2$)$_{y'}$—HN—CO—N=N—CO—NH—(CH$_2$)$_y$—Si(OCH$_3$)$_3$ (VII-a)

(CH$_3$)(CH$_3$O)$_2$Si—(CH$_2$)$_{y'}$—HN—CO—N=N—CO—NH—(CH$_2$)$_y$—Si(OCH$_3$)$_2$(CH$_3$) (VII-b)

(CH$_3$)$_2$(CH$_3$O)Si—(CH$_2$)$_{y'}$—HN—CO—N=N—CO—NH—(CH$_2$)$_y$—Si(OCH$_3$)(CH$_3$)$_2$ (VII-c)

(C$_2$H$_5$O)$_3$Si—(CH$_2$)$_{y'}$—HN—CO—N=N—CO—NH—(CH$_2$)$_y$—Si(OC$_2$H$_5$)$_3$ (VII-d)

(CH$_3$)(C$_2$H$_5$O)$_2$Si—(CH$_2$)$_{y'}$—HN—CO—N=N—CO—NH—(CH$_2$)$_y$—Si(OC$_2$H$_5$)$_2$(CH$_3$) (VII-e)

(CH$_3$)$_2$(C$_2$H$_5$O)Si—(CH$_2$)$_{y'}$—HN—CO—N=N—CO—NH—(CH$_2$)$_y$—Si(OC$_2$H$_5$)(CH$_3$)$_2$ (VII-f)

(HO)$_3$Si—(CH$_2$)$_{y'}$—HN—CO—N=N—CO—NH—(CH$_2$)$_y$—Si(OH)$_3$ (VII-g)

(CH$_3$)(HO)$_2$Si—(CH$_2$)$_{y'}$—HN—CO—N=N—CO—NH—(CH$_2$)$_y$—Si(OH)$_2$(CH$_3$) (VII-h)

(CH$_3$)$_2$(HO)Si—(CH$_2$)$_{y'}$—HN—CO—N=N—CO—NH—(CH$_2$)$_y$—Si(OH)(CH$_3$)$_2$ (VII-i)

(C$_2$H$_5$)(HO)$_2$Si—(CH$_2$)$_{y'}$—HN—CO—N=N—CO—NH—(CH$_2$)$_y$—Si(OH)$_2$(C$_2$H$_5$) (VII-k)

(C$_2$H$_5$)$_2$(HO)Si—(CH$_2$)$_{y'}$—HN—CO—N=N—CO—NH—(CH$_2$)$_y$—Si(OH)(C$_2$H$_5$)$_2$ (VII-l)

Symmetric or asymmetric azosilane compounds in which A and Z comprise an oxygen atom as heteroatom are, for example, those corresponding to the formulae (VIII) or (IX) which follow, in which y and y', which are identical or different for the same formula, are integers from 1 to 6, preferably from 1 to 4, more preferably equal to 3:

A-CO—N=N—CO—O—(CH$_2$)$_y$—Si G$^1_{(3-a)}$G$^2_{(a)}$ (VIII)

G$^4_{(b)}$G$^3_{(3-b)}$Si—(CH$_2$)$_{y'}$—O—CO—N=N—CO—O—(CH$_2$)$_y$—Si G$^1_{(3-a)}$G$^2_{(a)}$ (IX)

Specific examples of compounds of formula (VIII) are those of formulae (VIII-n):

CH$_3$—O—CO—N=N—CO—O—(CH$_2$)$_y$—Si(OCH$_3$)$_3$ (VIII-a)

CH$_3$—O—CO—N=N—CO—O—(CH$_2$)$_y$—Si(OCH$_3$)$_2$(CH$_3$) (VIII-b)

CH$_3$—O—CO—N=N—CO—O—(CH$_2$)$_y$—Si(OCH$_3$)(CH$_3$)$_2$ (VIII-c)

C$_2$H$_5$—O—CO—N=N—CO—O—(CH$_2$)$_y$—Si(OCH$_3$)$_3$ (VIII-d)

C$_2$H$_5$—O—CO—N=N—CO—O—(CH$_2$)$_y$—Si(OCH$_3$)$_2$(CH$_3$) (VIII-e)

C$_2$H$_5$—O—CO—N=N—CO—O—(CH$_2$)$_y$—Si(OCH$_3$)(CH$_3$)$_2$ (VII-f)

CH$_3$—O—CO—N=N—CO—O—(CH$_2$)$_y$—Si(OC$_2$H$_5$)$_3$ (VIII-g)

CH$_3$—O—CO—N=N—CO—O—(CH$_2$)$_y$—Si(OC$_2$H$_5$)$_2$(CH$_3$) (VIII-h)

CH$_3$—O—CO—N=N—CO—O—(CH$_2$)$_y$—Si(OC$_2$H$_5$)(CH$_3$)$_2$ (VIII-i)

C$_2$H$_5$—O—CO—N=N—CO—NH—(CH$_2$)$_y$—Si(OC$_2$H$_5$)$_3$ (VIII-j)

C$_2$H$_5$—O—CO—N=N—CO—O—(CH$_2$)$_y$—Si(OC$_2$H$_5$)$_2$(CH$_3$C$_2$H$_5$) (VIII-k)

C$_2$H$_5$—O—CO—N=N—CO—O—(CH$_2$)$_y$—Si(OC$_2$H$_5$)(CH$_3$C$_2$H$_5$)$_2$ (VIII-l)

CH$_3$—O—CO—N=N—CO—O—(CH$_2$)$_y$—Si(OH)$_3$ (VIII-m)

CH$_3$—O—CO—N=N—CO—O—(CH$_2$)$_y$—Si(OH)$_2$(CH$_3$) (VIII-n)

CH$_3$—O—CO—N=N—CO—O—(CH$_2$)$_y$—Si(OH)(CH$_3$)$_2$ (VIII-o)

C$_2$H$_5$—O—CO—N=N—CO—O—(CH$_2$)$_y$—Si(OH)$_3$ (VIII-p)

C$_2$H$_5$—O—CO—N=N—CO—O—(CH$_2$)$_y$—Si(OH)$_2$(CH$_3$C$_2$H$_5$) (VIII-q)

C$_2$H$_5$—O—CO—N=N—CO—O—(CH$_2$)$_y$—Si(OH)(CH$_3$C$_2$H$_5$)$_2$ (VIII-r)

Specific examples of compounds of formula (IX) are those of formulae (IX-n):

(CH$_3$O)$_3$Si—(CH$_2$)$_{y'}$—O—CO—N=N—CO—O—(CH$_2$)$_y$—Si(OCH$_3$)$_3$ (IX-a)

(CH$_3$)(CH$_3$O)$_2$Si—(CH$_2$)$_{y'}$—O—CO—N=N—CO—O—(CH$_2$)$_y$—Si(OCH$_3$)$_2$(CH$_3$) (IX-b)

(CH$_3$)$_2$(CH$_3$O)Si—(CH$_2$)$_{y'}$—O—CO—N=N—CO—O—(CH$_2$)$_y$—Si(OCH$_3$)(CH$_3$)$_2$ (IX-c)

(C$_2$H$_5$O)$_3$Si—(CH$_2$)$_{y'}$—O—CO—N=N—CO—O—(CH$_2$)$_y$—Si(OC$_2$H$_5$)$_3$ (IX-d)

(CH$_3$C$_2$H$_5$)(C$_2$H$_5$O)$_2$Si—(CH$_2$)$_{y'}$—O—CO—N=N—CO—O—(CH$_2$)$_y$—Si(OC$_2$H$_5$)$_2$(CH$_3$C$_2$H$_5$) (IX-e)

(CH$_3$C$_2$H$_5$)$_2$(C$_2$H$_5$O)Si—(CH$_2$)$_{y'}$—O—CO—N=N—CO—O—(CH$_2$)$_y$—Si(OC$_2$H$_5$)(CH$_3$C$_2$H$_5$)$_2$ (IX-f)

(HO)$_3$Si—(CH$_2$)$_{y'}$—O—CO—N=N—CO—O—(CH$_2$)$_y$—Si(OH)$_3$ (IX-g)

(CH$_3$)(HO)$_2$Si—(CH$_2$)$_{y'}$—O—CO—N=N—CO—O—(CH$_2$)$_y$—Si(OH)$_2$(CH$_3$) (IX-h)

(CH$_3$)$_2$(HO)Si—(CH$_2$)$_{y'}$—O—CO—N=N—CO—O—(CH$_2$)$_y$—Si(OH)(CH$_3$)$_2$ (IX-i)

(C$_2$H$_5$)(HO)$_2$Si—(CH$_2$)$_{y'}$—O—CO—N=N—CO—O—(CH$_2$)$_y$—Si(OH)$_2$(C$_2$H$_5$) (IX-k)

(C$_2$H$_5$)$_2$(HO)Si—(CH$_2$)$_{y'}$—O—CO—N=N—CO—O—(CH$_2$)$_y$—Si(OH)(C$_2$H$_5$)$_2$ (IX-l)

All the specific formulae (III) to (IX) above would cover Compounds II existing in the form of azosilanes but other organosilicon compounds can also be used, for example azosiloxanes, themselves also polyfunctional (at least bifunctional), comprising, as G and/or G' groups, in the above formula (II), one or more siloxane unit(s) in place of the silane unit(s), or mixtures of such siloxanes with such silanes. It should be remembered that "siloxane" should be understood as meaning, in a known way, any oligomeric or polymeric compound comprising at least one (i.e., one or more) ≡Si—O—Si≡ group(s).

Thus, according to another possible symbolic representation, Compound II is an organosilicon compound comprising the siloxyl units of following general formulae:

$$[(G^0)_3SiO_{1/2}]_m[(G^0)_2SiO_{2/2}]_n[G^0SiO_{3/2}]_o[SiO_{4/2}]_p$$
$$[(G^2)_c(G^1)_{c'}(A\text{-}CO\text{—}N\text{=}N\text{—}CO\text{-}Z)SiO_{(3-c-c')/2}]_q \quad (X)$$

in which:
- m, n, o and p each represent a whole or fractional number equal to or greater than 0;
- q represents a whole or fractional number equal to or greater than 1;
- c represents an integer chosen from 0, 1, 2 and 3;
- c' represents an integer chosen from 0, 1 and 2;
- the sum c+c' lies within the range from 0 to 3, with the conditions according to which:
  - when c=0, then at least one $G^0$ symbol corresponds to the definition given for $G^2$;
  - when c+c'=3, then m=n=o=p=0 (zero);
- the $G^0$ symbols, which are identical or different, each represent one of the groups corresponding to $G^2$ or $G^1$;
- A, Z, $G^1$ and $G^2$ have the definitions given above for the general formula (II) and for the specific formulae (III) to (IX).

A person skilled in the art understands that such a generic formula (X) makes it possible to define an organosilicon compound chosen from the group consisting of azosilanes, azosiloxanes (including siloxane oligomers and polymers) and the mixtures of such compounds. This simplified notation is in particular well known in the field of organosiloxanes; it encompasses the various specific formulae possible for the siloxyl units, whatever in particular their degree of functionalization, their position on the siloxane molecule or chain (for example along the chain or at the chain end(s)) or the nature of the siloxane (for example, a linear, branched or cyclic polyorganosiloxane or a random, sequential or block copolymer). In particular, it should be clearly understood that the (A-CO—N=N—CO-Z) group is connected to the Si atom of the $SiO_{(3-c-c')/2}$ unit via the divalent -Z- radical.

In other words, it is intended to define by the formula (X), within the meaning of the invention, the following compounds:
- (α) at least one functionalized azoorganosilane corresponding to the formula (III) or, which is entirely equivalent, to the formula (X) in which m=n=p=o=0 (zero), q=1 and c+c'=3;
- (β) at least one functionalized azoorganosiloxane corresponding to the formula (X) in which the sum c+c' then lies within the range from 0 to 2 and either at least one of the numbers m, n, o or p is other than 0 (zero) and q is equal to or greater than 1; or q is greater than 1 and each of the numbers m, n, o or p then has any value; and
- (γ) any mixture of the above compounds (α) and (β).

The azosilanes of (α) type above can be prepared according to a synthetic process comprising the stages described below.

A precursor silane of formula $(G^2)_c(G^1)_{c'}Si$—$P^1$ is first of all reacted with a precursor hydrazo derivative of formula $P^2$—NH—NH—CO-A, in which formulae the $G^1$, $G^2$ and A symbols are as defined above, c+c'=3 and $P^1$ and $P^2$ represent groups each having a structure and a functionality such that these groups are capable of reacting with one another to give rise to the central sequence -Z-CO— so as to result in the hydrazosilane of formula:

$$(G^2)_c(G^1)_{c'}Si\text{-}Z\text{-}CO\text{—}NH\text{—}NH\text{—}CO\text{-}A$$

which is subsequently subjected to an oxidation reaction on the hydrazo group according to the following scheme:

Oxidation easily takes place by bearing out the reaction using an oxidizing system based, for example, on N-bromosuccinimide and pyridine, which are used in stoichiometric amount or in excess with respect to the latter.

In the case, for example, of the preparation of the organosilanes of formula (VI) which are particularly well suited, in the structure of which the Z symbol then represents the divalent radical —NH—$(CH_2)_y$— (y being an integer from 1 to 6, preferably 1 to 4, more preferably equal to 3), the synthetic scheme applied is, for example, as follows:

A precursor silane of formula $(G^2)_a(G^1)_{3-a}Si$—$(CH_2)_y$—NCO is reacted with a precursor hydrazo derivative of formula $H_2N$—NH—CO-A to produce the hydrazosilane of formula:

$$(G^2)_a(G^1)_{3-a}Si\text{—}(CH_2)_y\text{—}NH\text{—}CO\text{—}NH\text{—}NH\text{—}CO\text{-}A$$

This hydrazosilane is then subjected to a reaction in which the hydrazo group is oxidized according to the following scheme:

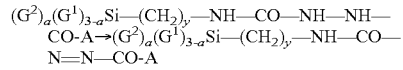

As regards the practical manner of bearing out the process which has just been described in order to obtain the hydrazosilane described above, reference may be made, for example, to the patent document FR-A-2 340 323 (or U.S. Pat. No. 4,118,367).

The functionalized organosilicon compounds of (β) and (γ) type can be prepared according to a synthetic process which consists in oxidizing the hydrazo group of the precursor silane $(G^2)_c(G^1)_{c'}Si\text{-}Z\text{-}CO$—NH—NH—CO-A using an oxidizing system comprising at least one oxidizing agent (for example a halogen, such as a bromine) and at least one base (for example an inorganic base, such as $Na_2CO_3$), while involving this time an additional reactant chosen from mono- and polyalkoxysilanes (by way of example, trimethylethoxysilane) and while preferably operating in an organic liquid medium (for example while using a solvent, such as dichloromethane).

An advantageous procedure for bearing out this process consists in charging to the reactor, at ambient temperature (23° C.): the precursor silane $((G^2)_c(G^1)_{c'}Si\text{-}Z\text{-}CO$—NH—NH—CO-A), the base (its amount depending on the oxidizing agent employed; for example, in the case of bromine, two molar equivalents of base are used with respect to the bromine), the organic solvent and the additional reactant (its amount corresponding, for example, to at least one molar equivalent with respect to the precursor), and in then gradually adding the oxidizing system to the reaction medium (the molar amount of oxidizing system being, for example, stoichiometric with respect to that of the precursor).

Particularly suitable as azoorganosiloxanes of (β) type are those corresponding to the formula (X) in which the sum c+c' is equal to 1 or 2; m lies within the range from 1 to 2; n=o=p=0 (zero) and q=1.

Mention may be made, as example of such an azosiloxane compound (β) of generic formula (X) in which:

c=2;
c'=0 (zero);
q=1;
m=1;
n=p=o=0 (zero), of, for example, the compound of formula (Me=methyl, Et=ethyl):

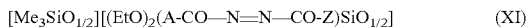

$$[Me_3SiO_{1/2}][(EtO)_2(A-CO-N=N-CO-Z)SiO_{1/2}] \quad (XI)$$

in particular the compound of specific formula:

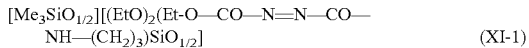

$$[Me_3SiO_{1/2}][(EtO)_2(Et-O-CO-N=N-CO- \\ NH-(CH_2)_3)SiO_{1/2}] \quad (XI-1)$$

It should be remembered that the representation of the formulae (XI) and (XI-1) above means, in a way well known to a person skilled in the art, that there thus exists a first Si atom bearing both the "X" (activated azo) functional group and two "Y" (ethoxy) functional groups, this Si atom sharing (on its 4$^{th}$ valency) an oxygen atom with a second Si atom bearing the three methyl groups.

Such a compound of formula (XI-1) thus exhibits the following expanded form:

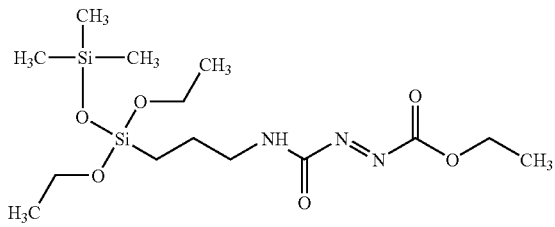 [SMILES: CCOC(=O)/N=N/C(=O)NCCC[Si](OCC)(OCC)O[Si](C)(C)C]

Mention may be made, as another example of an azosiloxane compound of generic formula (X) in which, for example:

c=1;
c'=0 (zero);
q=1;
m=2;
n=p=o=0 (zero), of, for example, the compound of formula (Me=methyl, Et=ethyl):

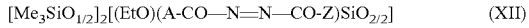

$$[Me_3SiO_{1/2}]_2[(EtO)(A-CO-N=N-CO-Z)SiO_{2/2}] \quad (XII)$$

in particular the compound of specific formula:

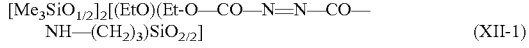

$$[Me_3SiO_{1/2}]_2[(EtO)(Et-O-CO-N=N-CO- \\ NH-(CH_2)_3)SiO_{2/2}] \quad (XII-1)$$

The above representation of the formulae (XII) and (XII-1) means, in a known way, that there exists a central Si atom bearing the "X" (activated azo) functional group and the "Y" (ethoxy) functional group on two of its valencies, sharing an oxygen atom with two adjacent Si atoms bearing the methyl groups.

Such a compound of formula (XII-1) thus exhibits the following expanded form:

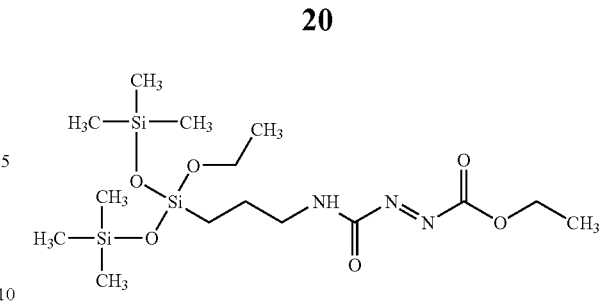

In the case, for example, of the preparation of the organosiloxanes of formulae (XI) and (XII) which are particularly well suited, in the structure of which the A symbol represents the monovalent radical Et-O— and the Z symbol represents the divalent radical —NH—$(CH_2)_3$—, the synthetic scheme applied is, for example, as follows.

10 g (28.4 mmol, 1 eq.) of the following compound 1 (Et=ethyl):

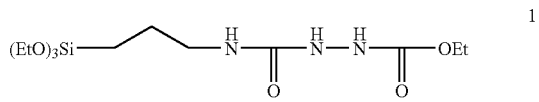

are introduced into a 250 ml reactor, followed by 7.53 g (71 mmol, i.e. 2.5 eq.) of dry $Na_2CO_3$ and 50 ml of a 50/50 (vol/vol) mixture of trimethylethoxysilane and dichloromethane. A solution of 4.55 g of bromine (28.4 mmol, i.e. 1 eq.) in 15 ml of dichloromethane is added dropwise over 1 hour. The reaction mixture is stirred for an additional 30 min after the end of the addition of the bromine.

The reaction mixture is subsequently filtered and then concentrated under vacuum. 9.77 g of a bright orange fluid liquid are obtained. The $^1$H NMR analysis shows that the compound 1 has been completely consumed, that the azo group has been selectively formed and that the SiOEt loss is limited.

The final product obtained (compound (γ) above) is a mixture of the two siloxane entities of formulae (XI-1) and (XII-1) and of the silane entity (VI-j):

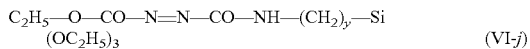

$$C_2H_5-O-CO-N=N-CO-NH-(CH_2)_y-Si \\ (OC_2H_5)_3 \quad (VI\text{-}j)$$

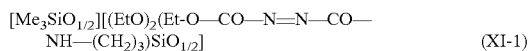

$$[Me_3SiO_{1/2}][(EtO)_2(Et-O-CO-N=N-CO- \\ NH-(CH_2)_3)SiO_{1/2}] \quad (XI\text{-}1)$$

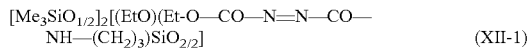

$$[Me_3SiO_{1/2}]_2[(EtO)(Et-O-CO-N=N-CO- \\ NH-(CH_2)_3)SiO_{2/2}] \quad (XII\text{-}1)$$

More generally, the azoorganosiloxanes of (β) type are preferably siloxane oligomers comprising from 2 to 20, more preferably from 2 to 12 (for example from 2 to 6), silicon atoms (number corresponding to the sum m+n+o+p+q of the formula X).

In the rubber compositions in accordance with the invention, the overall content of coupling system is preferably between 2 and 15 phr, more preferably between 2 and 12 phr (for example between 4 and 8 phr). However, it is generally desirable to use as little as possible thereof. With respect to the weight of reinforcing inorganic filler, the level of coupling system typically represents between 0.5 and 15% by weight, with respect to the amount of inorganic filler; preferably, it is less than 12% by weight, more preferably less than 10% by weight, with respect to this amount of filler.

The (Compound I:Compound II) ratio by weight is preferably between 1:10 and 10:1, more preferably between 1:5 and 5:1, more preferably still between 1:3 and 3:1, for example between 1:2 (0.5) and 2:1 (2.0).

All or a portion of the coupling system according to the invention might be pregrafted (via the "X" functional groups) to the isoprene elastomer of the composition of the invention, the elastomer thus functionalized or "precoupled" then comprising the free "Y" functional groups for the reinforcing inorganic filler. All or a portion of this coupling system might also be pregrafted (via the "Y" functional groups) to the reinforcing inorganic filler, it being possible for the filler thus "precoupled" subsequently to be bonded to the diene elastomer via the free "X" functional groups. However, it is preferable, in particular for reasons of better use of the rubber compositions in the raw state, to use all or a portion of the coupling agent either grafted to the filler or in the free state (i.e., nongrafted).

II-4. Various Additives

The rubber compositions of the treads in accordance with the invention also comprise all or a portion of the usual additives generally used in elastomer compositions intended for the manufacture of treads, such as, for example, plasticizing agents or extending oils, whether the latter are aromatic or nonaromatic in nature, pigments, protection agents, such as antiozone waxes, chemical antiozonants, antioxidants, which it is preferable to keep present in the body, antifatigue agents, reinforcing or plasticizing resins, methylene acceptors (for example, phenolic novolak resin) or methylene donors (for example, HMT or H3M), such as described, for example, in the abovementioned Application WO 02/10269, a crosslinking system based either on sulphur or on sulphur donors and/or on peroxide and/or on bismaleimides, vulcanization accelerators or vulcanization activators.

Preferably, these compositions comprise, as preferred nonaromatic or very slightly aromatic plasticizing agent, at least one compound chosen from the group consisting of naphthenic oils, paraffinic oils, MES oils, TDAE oils, glycerol esters (in particular trioleates), plasticizing hydrocarbon resins exhibiting a high Tg preferably of greater than 30° C., and the mixtures of such compounds. The overall level of such a preferred plasticizing agent is preferably between 15 and 45 phr, more preferably between 20 and 40 phr.

Inert fillers (i.e., nonreinforcing fillers), such as particles of clay, bentonite, talc, chalk, kaolin, which can be used, for example, in side walls or treads of coloured tyres, can also be added, depending on the targeted application, to the reinforcing filler described above, that is to say the nonblack reinforcing filler (in particular inorganic filler) plus carbon black, if applicable.

These compositions can also comprise, in addition to the coupling agents, coupling activators, covering agents (comprising for example, the single functional group Y) for the nonblack reinforcing filler or more generally processing aids capable, in a known way, by virtue of an improvement in the dispersion of the nonblack filler in the rubber matrix and of a lowering in the viscosity of the compositions, of improving their processing property in the raw state, these aids being, for example, hydroxylated or hydrolysable silanes, such as hydroxysilanes or alkylalkoxysilanes (in particular alkyltriethoxysilanes), polyols, polyethers (for example polyethylene glycols), primary, secondary or tertiary amines (for example trialkanolamines), hydroxylated or hydrolysable polyorganosiloxanes, for example α,ω-dihydroxypolyorganosiloxanes (in particular α,ω-dihydroxypolydimethylsiloxanes), and the mixtures of such compounds.

II-5. Preparation of the Rubber Compositions

The compositions are manufactured in appropriate mixers using two successive preparation phases well known to a person skilled in the art: a first phase of thermomechanical working or kneading (sometimes referred to as "nonproductive" phase) at high temperature, up to a maximum temperature (recorded as $T_{max}$) of between 110° C. and 190° C., preferably between 130° C. and 180° C., followed by a second phase of mechanical working (referred to as "productive" phase) at a lower temperature, typically of less than 120° C., for example between 60° C. and 100° C., finishing phase during which the crosslinking or vulcanization system is incorporated.

The manufacturing process according to the invention is characterized in that at least the reinforcing inorganic filler and all or a portion of the coupling system are incorporated by kneading with the diene elastomer, during the first "nonproductive" phase, that is to say that at least these various base constituents are introduced into the mixer and that kneading is carried out thermomechanically, in one or more stages, until a maximum temperature of between 110° C. and 190° C., preferably between 130° C. and 180° C., is reached.

By way of example, the first (nonproductive) phase is carried out in a single thermomechanical stage during which, in a first step, all the necessary base constituents (diene elastomer, reinforcing inorganic filler and all or a portion of the coupling system) are introduced into an appropriate mixer, such as a normal internal mixer, followed, in a second step, for example after kneading for one to two minutes, by the optional additional covering agents or processing aids and various other additives, with the exception of the vulcanization system. The total duration of the kneading, in this nonproductive phase, is preferably between 2 and 10 minutes. After cooling the mixture thus obtained, the second part of the coupling system, if applicable, and then the vulcanization system are then incorporated at low temperature, generally in an external mixer such as an open mill; the entire mixture is then mixed (productive phase) for a few minutes, for example between 5 and 15 minutes.

As regards the introduction of the coupling system, according to a particularly preferred embodiment, all of Compound I (silane sulphide) is introduced during the nonproductive phase, at the same time as the reinforcing inorganic filler, while the introduction of Compound II (azosilane) can be divided up (for example in a proportion of 25/75, 50/50 or 75/25 respective parts) over the two successive phases, first nonproductive (i.e., in the internal mixer) and then productive (i.e., in the external mixer); however, according to other possible embodiments, all of Compound II might be introduced either in the nonproductive phase or in the productive phase.

It should be noted that it is possible to introduce all or a portion of the coupling system (Compound I and/or Compound II) in a form supported (placing on the support being carried out beforehand) on a solid compatible with the chemical structures corresponding to this Compound; such a support is in particular carbon black. For example, when dividing up between the two successive phases above, it may be advantageous to introduce the second portion of the coupling system, onto the external mixer, after placing on a support in order to faciliate the incorporation and the dispersion of the Compound(s) in question.

The final composition thus obtained is subsequently calendered, for example in the form of a sheet, or else extruded, for example to form a rubber profiled element used for the manufacture of semi-finished products, such as treads, crown reinforcement plies, side walls, carcass reinforcement plies, beads, protectors, air chambers or airtight internal rubbers for a tubeless tyre.

The vulcanization (or curing) is carried out in a known way at a temperature generally of between 130° C. and 200° C., preferably under pressure, for a sufficient time which can vary, for example, between 5 and 90 min, depending in particular on the curing temperature, the vulcanization system adopted and the vulcanization kinetics of the composition under consideration.

The vulcanization system proper is preferably based on sulphur and on a primary vulcanization accelerator, in particular an accelerator of the sulphenamide type. Various known vulcanization activators or secondary accelerators, such as zinc oxide, stearic acid, guanidine derivatives (in particular diphenylguanidine), and the like, incorporated during the first nonproductive phase and/or during the productive phase, are additional to this crosslinking system. Sulphur is used at a preferable level of between 0.5 and 10 phr, more preferably of between 0.5 and 5.0 phr, for example between 0.5 and 3.0 phr, when the invention is applied to a tyre tread. The primary vulcanization accelerator is used at a preferable level of between 0.5 and 10 phr, more preferably of between 0.5 and 5.0 phr in particular when the invention applies to a tyre tread.

The invention relates to the rubber compositions described above both in the "raw" state (i.e., before curing) and in the "cured" or vulcanized state (i.e., after crosslinking or vulcanization). The compositions in accordance with the invention can be used alone or as a blend (i.e., as a mixture) with any other rubber composition which can be used for the manufacture of tyres.

III. Examples Of The Implementation Of The Invention

III-1. Synthesis of Compound II

This example illustrates the preparation of a specific azosilane of formula (VI-j):

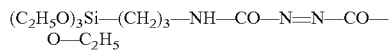

in two stages, as follows:
by reaction of a silane isocyanate with an ethyl carbazate to form a hydrazino precursor, according to the following reaction scheme:

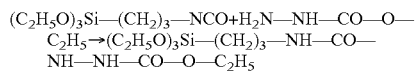

and then oxidation of the above precursor to produce the compound ethyl N-(3-triethoxysilylpropyl)carbamoylazoformate.

A) Synthesis of the Precursor Ingredient:
a) charges:

| 96% Isocyanatopropyltriethoxysilane | 99.8 g | 384 mmol |
| --- | --- | --- |
| Ethyl carbazate | 41.2 g | 384 mmol |
| Anhydrous toluene | 384 ml | — | b) Procedure:

The ethyl carbazate and the anhydrous toluene are charged at ambient temperature (23° C.) to the reactor, which is placed under an argon atmosphere. The reactor is stirred at 300 revolutions/min and the reaction mixture is subsequently heated to 60° C. The reaction mixture becomes virtually homogeneous under warm conditions. The 99.8 g of silane are subsequently added over 60 min using a pressure-equalizing dropping funnel. The reaction mixture is kept stirred at 60° C. for 2 hours before returning to ambient temperature. The reaction mixture is left standing at ambient temperature for a few hours. A white solid crystallizes. It is subsequently filtered off, washed with 2 times 150 ml of isopropyl ether and then pulled superficially dry under vacuum. The solid is finally dried in an oven at 60° C. to a constant weight equal to 131.5 g. The product is analysed by NMR (molar purity >99%). Yield=97.4%.

B) Synthesis of Compound II (Final Azosilane):

The azosilane of formula (VI-j) is obtained in one stage from the precursor by oxidation of the hydrazino functional group to give an azo functional group using an oxidizing system based on N-bromosuccinimide (NBS) and pyridine, which are added in stoichiometric amounts with respect to the precursor.

a) Charges:

| Precursor | 20.0 g | 57 mmol |
| --- | --- | --- |
| 99% N-bromosuccinimide | 10.13 g | 57 mmol |
| Pyridine | 4.5 g | 57 mmol |
| Dichloromethane | 100 ml | — | b) Procedure:

The precursor, the pyridine and the dichloromethane are charged to a reactor, which is placed under an argon atmosphere; the reaction medium is homogeneous and virtually colourless. The N-bromosuccinimide is added in 30 minutes using a spatula. The temperature is kept below 25° C. The reaction mixture turns bright orange from the first addition of NBS. The reaction medium is kept stirred at ambient temperature for 2 hours after the end of the addition of the NBS. The reaction medium is concentrated under reduced pressure on a rotary evaporator.

The residue, which exists in the form of an orangey paste, is taken up in 100 ml of a heptane/i-$Pr_2O$ (1/1:vol/vol) mixture and then filtered through a sintered glass funnel (125 ml) with a porosity of 4. The filter cake is washed with 4 times 25 ml of additional preceding solvent mixture. The mother liquors are filtered a second time through the cake. The filtrate is concentrated under reduced pressure. An odourless bright orange liquid is obtained: w=18.8 g.

This liquid is analysed by NMR and its molar composition is as follows (mol %):
azosilane of formula VI-j: 94.5%;
precursor compound: 0.2%;
succinimide: 5%;
pyridine residues: 0.3%.

III-2. Preparation of the Rubber Compositions

The tests which follow are carried out in the following way: the natural rubber, the reinforcing filler, the coupling system (Compound I+approximately 50% of Compound II) and then, after kneading for one to two minutes, the various other ingredients, with the exception of the vulcanization system, are introduced into an internal mixer, 70% filled and having an initial vessel temperature of approximately 80° C. Thermomechanical working (nonproductive phase) is then carried out in one stage (total duration of the kneading equal to approximately 4 min) until a maximum "dropping" temperature of approximately 160° C. is reached. The mixture thus obtained is recovered and cooled and the remainder of Compound II (approximately 50%) and then the vulcanization system (sulphur and sulphenamide accelerator) are added on an external mixer (homofinisher), the combined mixture being mixed (productive phase) for approximately 5-10 min.

The compositions thus obtained are subsequently calendered, either in the form of sheets (thickness of 2 to 3 mm) or of fine sheets of rubber, for the measurement of their physical or mechanical properties, or in the form of profiled elements which can be used directly, after cutting and/or assembling to the desired dimensions, for example as tyre semi-finished products, in particular as tyre treads.

III-3. Characterization of the Rubber Compositions

The aim of this test is to demonstrate the improved coupling performance contributed by the coupling system of the invention, compared with a conventional coupling agent.

For this, three compositions based on natural rubber which are reinforced with carbon black or HDS silica are prepared, these three compositions differing essentially in the following technical characteristics:
- composition C-1: carbon black filler (thus without coupling agent);
- composition C-2: silica filler with conventional silane coupling agent;
- composition C-3: silica filler with coupling system according to the invention.

The coupling system of the composition C-3 is used at an isomolar level of silicon in comparison with the control composition C-2, that is to say that, whatever the composition, the same number of moles of "Y" functional groups (Si(OEt)$_3$) reactive with regard to the silica and its surface hydroxyl groups is used.

The conventional coupling agent of the control composition C-2 is TESPT. It should be remembered that TESPT is bis(3-triethoxysilylpropyl) tetrasulphide, sold in particular by Degussa under the name "Si69", of formula (Et=ethyl):

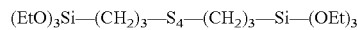

or, in expanded form:

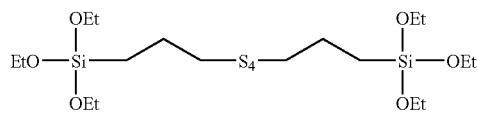

In the composition of the invention C-3, the above TESPT is combined with the azosilane of formula (Et=ethyl):

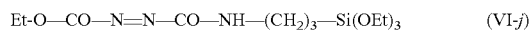     (VI-j)

or, in an expanded form:

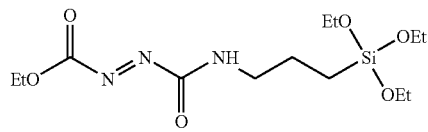 [SMILES: CCOC(=O)/N=N/C(=O)NCCC[Si](OCC)(OCC)OCC]

Tables 1 and 2 give the formulations of the various compositions (Table 1—levels of the various products, expressed in phr—parts by weight per one hundred parts of elastomer) and also their rheometric properties and properties after curing (at 150° C. for approximately 20 min); the vulcanization system is composed of sulphur and sulphenamide. The single appended FIGURE reproduces the curves of modulus (in MPa) as a function of the elongation (%); these curves are annotated C1, C2 and C3 and correspond respectively to the compositions C-1, C-2 and C-3.

The examination of the various results in Table 2 shows first of all, for the composition in accordance with the invention C-3 compared with the control composition C-2, much faster vulcanization kinetics, illustrated by a conversion rate constant K which is markedly greater (multiplied by 1.4) and by a markedly reduced curing time (T$_{99}$–Ti) (divided by 1.4).

After curing, the composition in accordance with the invention exhibits substantially equivalent properties at break, but the highest values for modulus under strong strain (M300) and for M300/M100 ratio, a clear indicator to a person skilled in the art of better reinforcing contributed by the inorganic filler and the novel coupling system. The appended FIGURE indeed confirms the above statement: the composition of the invention C-3 (curve C3) reveals a greater level of reinforcement (modulus) compared with the control composition C-2 (curve C2), whatever the degree of elongation under high strain (elongations of 100% and more), the deviation between the two curves being all the more pronounced as the elongation increases; such behaviour clearly illustrates an improved coupling between the reinforcing inorganic filler and the diene elastomer.

Above all, the composition of the invention C-3 reveals, compared with C-2, a markedly improved hysteresis, as is shown by substantially reduced values for tan($\delta$)$_{max}$ and $\Delta G^*$, which is the recognized indicator of a reduction in the rolling resistance of tyres and consequently in the energy consumption of the motor vehicles equipped with such tyres.

Finally, a fact which is surprising to a person skilled in the art, the ratio (M300/M100) achieved with regard to the composition of the invention C-3 is greater than that obtained with regard to the natural rubber matrix conventionally filled with carbon black (control composition C-1), which is a sign of an excellent level of reinforcement, confirmed in the appended FIGURE by very similar tensile curves C1 and C3; such results make it possible to predict a very good ability of the composition of the invention to resist wear.

The invention has particularly advantageous applications in rubber compositions intended for the manufacture of tyre treads based on isoprene elastomer, in particular when these treads are intended for tyres for commercial vehicles of the heavy-duty type.

TABLE 1

| Composition No.: | C-1 | C-2 | C-3 |
|---|---|---|---|
| NR (1) | 100 | 100 | 100 |
| silica (2) | — | 50 | 50 |
| carbon black (3) | 45 | — | — |
| carbon black N330 | — | 4 | 4 |
| silane (4) | — | 4 | 2 |
| silane (5) | — | — | 2.7 |
| ZnO | 3 | 3 | 3 |
| antioxidant (6) | 1.9 | 1.9 | 1.9 |
| stearic acid | 2.5 | 2.5 | 2.5 |
| sulphur | 1.5 | 1.5 | 1.5 |
| accelerator (7) | 1.0 | 1.8 | 1.8 |

(1) peptized natural rubber NR;
(2) "Zeosil 1165 MP" silica from Rhodia in the form of microbeads (BET and CTAB: approximately 150-160 m²/g);
(3) carbon black N234 (Degussa);
(4) TESPT ("Si69", Degussa);
(5) azosilane (formula VI-j);
(6) N-1,3-dimethylbutyl-N-phenyl-para-phenylenediamine ("Santoflex 6-PPD" from Flexsys);
(7) N-cyclohexyl-2-benzothiazolesulphenamide ("Santocure CBS" from Flexsys).

TABLE 2

| Composition No.: | C-1 | C-2 | C-3 |
|---|---|---|---|
| Properties before curing: | | | |
| Ti (min) | 5.5 | 7.6 | 9.1 |
| T$_{99}$ – Ti (min) | 11.7 | 18.0 | 13.0 |
| K (min$^{-1}$) | 0.395 | 0.251 | 0.357 |
| Properties after curing: | | | |
| M10 (MPa) | 4.64 | 5.82 | 4.66 |
| M100 (MPa) | 1.74 | 1.92 | 2.02 |

TABLE 2-continued

| Composition No.: | C-1 | C-2 | C-3 |
|---|---|---|---|
| M300 (MPa) | 2.10 | 1.84 | 2.51 |
| M300/M100 | 1.20 | 0.96 | 1.25 |
| $\tan(\delta)_{max}$ | 0.171 | 0.133 | 0.105 |
| $\Delta G^*$ | 2.30 | 2.03 | 1.07 |
| breaking stress (MPa) | 23 | 21 | 18 |
| elongation at break (%) | 675 | 730 | 585 |

The invention claimed is:

1. A tire comprising a composition, based on at least one isoprene elastomer, an inorganic filler as reinforcing filler and an (inorganic filler/isoprene elastomer) coupling system which provides the bonding between the inorganic filler and the isoprene elastomer, wherein said coupling system comprises:

as first coupling agent, a silane polysulfide compound (hereinafter "Compound I") that corresponds to the formula (I):

$$Y^1-Z^1-S_x-Z^2-Y^2 \qquad (I)$$

wherein:

x is an integer from 2 to 8;

$Z^1$ and $Z^2$, which are identical or different, each represent a divalent hydrocarbon radical comprising from 1 to 18 carbon atoms;

$Y^1$ and $Y^2$ which are identical or different, each correspond to one of the following formulae:

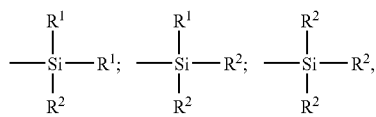

wherein:

the $R^1$ radicals, which are unsubstituted or substituted and identical to or different from one other represent a $C_1$-$C_{18}$ or $C_6$-$C_{18}$ aryl group;

the $R^2$ radicals, which are unsubstituted or substituted and identical to or different from one another, represent a $C_1$-$C_{18}$ alkoxyl or $C_5$-$C_{18}$ cycloalkoxyl group;

as second coupling agent, an at least bifunctional organosilicon compound (hereinafter "Compound II") which can be grafted, on the one hand, to the inorganic filler by means of a silyl functional group G and, on the other hand, to the elastomer by means of an azodicarbonyl functional group, the organosilicon compound having the formula:

$$\text{A-CO}-N=N-CO-Z-G \qquad (II)$$

wherein:

G is the silyl functional group bearing a hydroxyl or hydrolysable group attached to a silicon atom of the compound;

Z is a divalent bonding group connecting the azodicarbonyl functional group to the silyl functional group;

A represents a monovalent hydrocarbon group or the group of formula Z'-G' wherein:

Z', which is identical to or different from Z, is a divalent bonding group which makes it possible to connect the azodicarbonyl functional group to another silyl functional group G';

G', which is identical to or different from G, is a silyl functional group bearing another hydroxyl or hydrolysable group attached to a silicon atom;

A, Z and if applicable Z', independently, may comprise a heteroatom.

2. The tire according to claim 1, wherein $Z^1$ and $Z^2$ are chosen from the group consisting of $C_1$-$C_{10}$ alkylenes.

3. The tire according to claim 2, wherein $Z^1$ and $Z^2$ represent propylene.

4. The tire according to claim 1, wherein the $R^1$ radicals are chosen from $C_1$-$C_4$ alkyls.

5. The tire according to claim 1, wherein the $R^2$ radicals are chosen from the group consisting of $C_1$-$C_4$ alkoxyls.

6. The tire according to claim 4, wherein the silane polysulphide is a bis(3-trimethoxysilylpropyl) or a bis(3-triethoxysilylpropyl) polysulphide.

7. The tire according to claim 6, wherein the silane polysulphide is bis(3-triethoxysilylpropyl) disulphide or tetrasulphide.

8. The tire according to claim 6, wherein the silane polysulphide is a bis(monomethoxydimethylsilylpropyl) or bis(monoethoxydimethylsilylpropyl) polysulphide.

9. The tire according to claim 8, wherein the silane polysulphide is bis(monoethoxydimethylsilylpropyl) disulphide or tetrasulphide.

10. The tire according to claim 1, in which at least one of the groups A, Z and, if applicable, Z' comprises a heteroatom.

11. The tire according to claim 10, wherein the heteroatom is chosen from 0, S and N.

12. The tire according to claim 1, wherein Compound II is an organosilane.

13. The tire according to claim 12, wherein Compound II is an organosilane of formula:

$$\text{A-CO}-N=N-CO-Z-\text{Si } G^1_{(3-a)}G^2_{(a)} \qquad (III)$$

wherein:

a is an integer equal to 1, 2 or 3;

the $G^1$ radicals, which are substituted or unsubstituted and which are identical to or different from one another, are chosen from the group consisting of $C_1$-$C_{18}$ alkyls, $C_5$-$C_{18}$ cycloalkyls, and $C_6$-$C_{18}$ aryls;

the $G^2$ radicals, which are substituted or unsubstituted and which are identical to or different from one another, are chosen from the group consisting of hydroxyl, $C_1$-$C_{18}$ alkoxyls and $C_5$-$C_{18}$ cycloalkoxyls.

14. The tire according to claim 13, wherein the organosilane has the formula:

$$G^4_{(b)}G^3_{(3-b)}\text{Si}-Z'-CO-N=N-CO-Z-\text{Si } G^1_{(3-a)}G^2_{(a)} \qquad (IV)$$

wherein:

b, which is identical to or different from a, is an integer equal to 1, 2 or 3;

$G^3$ and $G^4$, which are respectively identical to or different from $G^1$ and $G^2$, have the same definitions as those given for $G^1$ and $G^2$;

Z', which is identical to or different from Z, has the same definition as Z.

15. The tire according to claim 13, wherein the organosilane has the formula:

$$R-O-CO-N=N-CO-Z-\text{Si } G^1_{(3-a)}G^2_{(a)} \qquad (V)$$

wherein R represents a $C_1$-$C_6$ alkyl.

16. The tire according to claim 15, wherein R represents methyl or ethyl.

17. The tire according to claim 13, wherein Z and, if applicable, Z' are a $C_1$-$C_{10}$ alkylene.

18. The tire according to claim 17, wherein the alkylene comprises a heteroatom chosen from O, S and N.

19. The tire according to claim 18, wherein Z and, if applicable, Z' are chosen from the group consisting of —(CH$_2$)$_y$—, —NH—(CH$_2$)$_y$— and —O—(CH$_2$)$_y$—, y being an integer from 1 to 6.

20. The tire according to claim 13, wherein the organosilane has the formula:

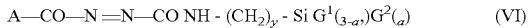   (VI)

wherein y is an integer from 1 to 6.

21. The tire according to claim 20, wherein A represents R—O-, R representing a C$_1$-C$_6$ alkyl and y is an integer from 1 to 4.

22. The tire according to claim 21, wherein R represents methyl or ethyl and y is equal to 3.

23. The tire according to claim 14, wherein the organosilane has the formula:

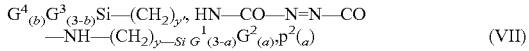   (VII)

wherein y is an integer from 1 to 6.

24. The tire according to claim 23, wherein y is an integer from 1 to 4.

25. The tire according to claim 13, wherein the organosilane has the formula:

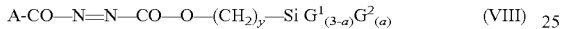   (VIII)

wherein y is an integer from 1 to 6.

26. The tire according to claim 25, wherein A represents R—O—, R representing a C$_1$-C$_6$ alkyl and y is an integer from 1 to 4.

27. The tire according to claim 26, wherein R represents methyl or ethyl and y is equal to 3.

28. The tire according to claim 14, wherein the organosilane has the formula:

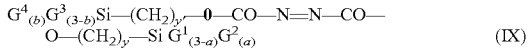   (IX)

wherein y and y' are identical or different, and each is an integer from 1 to 6.

29. The tire according to claim 28, y and y' each is an integer from 1 to 4.

30. The tire according to claim 13, wherein:
the radicals G$^1$ and, if applicable, G$^3$ are chosen from C$_1$-C$_4$ alkyls; and ethyl;
the radicals G$^2$ and, if applicable, G$^4$ are chosen from hydroxyl and C$_1$-C$_4$ alkoxyls.

31. The tire according to claim 1, wherein Compound II is an organosiloxane of formula:

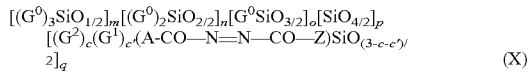   (X)

wherein:
the G$^1$ radicals, which are substituted or unsubstituted and which are identical to or different from one another, are chosen from the group consisting of C$_1$-C$_{18}$ alkyls, C$_5$-C$_{18}$ cycloalkyls and C$_6$-C$_{18}$ aryls;
the G$^2$ radicals, which are substituted or unsubstituted and which are identical to or different from one another, are chosen from the group consisting of hydroxyl, C$_1$-C$_{18}$ alkoxyls and C$_5$-C$_{18}$ cycloalkoxyls;
the G$^0$ symbols, which are identical or different, each represent one of the groups corresponding to G$^2$ or G$^1$;
c represents an integer chosen from 0, 1 and 2;
c' represents an integer chosen from 0, 1 and 2;
m, n, o and p each represent a whole or fractional number equal to or greater than 0;
q represents a whole or fractional number equal to or greater than 1;
the sum c+c' lies within the range from 0 to 2, with the condition according to which, when c=0, then at least one G$^0$ symbol corresponds to the definition of G$^2$; and
either at least one of m, n, o and p is a whole or fractional number other than 0 (zero) and q represents a whole or fractional number equal to or greater than 1;
or q is greater than 1 and then each of m, n, o and p has any value.

32. The tire according to claim 31, wherein:
the G$^1$ radicals are chosen from methyl and ethyl;
the G$^2$ radicals are chosen from hydroxyl, methoxyl and ethoxyl.

33. The tire according to claim 31, wherein Z and, if applicable, Z' are a C$_1$-C$_{10}$ alkylene.

34. The tire according to claim 33, wherein the alkylene comprises a heteroatom chosen from O, S and N.

35. The tire according to claim 34, wherein Z and, if applicable, Z' are chosen from the group consisting of —(CH$_2$)$_y$—, —NH—(CH$_2$)—O—(CH$_2$)$_y$—, y is an integer from 1 to 6.

36. The tire according to claim 1, wherein the composition is in The tread of the tire.

* * * * *